(12) United States Patent
Shirata et al.

(10) Patent No.: US 7,376,268 B2
(45) Date of Patent: May 20, 2008

(54) IMAGE PROCESSING APPARATUS FOR TRANSMITTING IMAGE DATA TO AN EXTERNAL DEVICE

(75) Inventors: Yasunobu Shirata, Tokyo (JP); Hiroyuki Kawamoto, Tokyo (JP); Tomoyuki Yoshida, Tokyo (JP); Isao Miyamoto, Tokyo (JP); Maki Ohyama, Tokyo (JP); Taira Nishita, Tokyo (JP); Atsushi Togami, Tokyo (JP); Satoshi Ohkawa, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 733 days.

(21) Appl. No.: 10/663,784

(22) Filed: Sep. 17, 2003

(65) Prior Publication Data

US 2004/0125410 A1   Jul. 1, 2004

(30) Foreign Application Priority Data

Sep. 17, 2002 (JP) .............................. 2002-269605
Sep. 20, 2002 (JP) .............................. 2002-274296

(51) Int. Cl.
*G06K 9/00* (2006.01)
*G06K 9/40* (2006.01)
*G03F 3/08* (2006.01)

(52) U.S. Cl. .................. 382/167; 382/274; 358/518; 358/521; 358/519

(58) Field of Classification Search ................. 382/167
See application file for complete search history.

(56) References Cited

U.S. PATENT DOCUMENTS

| | | | | |
|---|---|---|---|---|
| 5,589,954 | A * | 12/1996 | Watanabe | 358/518 |
| 5,712,930 | A * | 1/1998 | Watanabe | 382/270 |
| 5,982,999 | A * | 11/1999 | Aoyagi et al. | 358/1.18 |
| 6,301,025 | B1 * | 10/2001 | DeLean | 358/518 |
| 6,484,631 | B2 * | 11/2002 | Degani et al. | 101/171 |
| 6,503,004 | B2 | 1/2003 | Togami | |
| 6,546,132 | B1 * | 4/2003 | Bhattacharjya et al. | 382/167 |
| 6,927,870 | B1 * | 8/2005 | Shimazawa et al. | 358/1.15 |
| 6,967,744 | B1 * | 11/2005 | Kawamoto | 358/1.9 |
| 6,993,181 | B2 * | 1/2006 | Tabata et al. | 382/166 |

(Continued)

FOREIGN PATENT DOCUMENTS

JP    10-285419    10/1998

(Continued)

OTHER PUBLICATIONS

U.S. Appl. No. 09/654,050, filed Sep. 1, 2000, Miyazaki et al.

(Continued)

*Primary Examiner*—Wenpeng Chen
*Assistant Examiner*—Yuzhen Ge
(74) *Attorney, Agent, or Firm*—Oblon, Spivak, McClelland, Maier & Neustadt, P.C.

(57) ABSTRACT

The image data corresponding to an image is separated into areas corresponding to contents of the image. The image data in each of the area is subjected to an image processing specific to the content of the image. The image types are, for example, a character, a photograph, color, and presence of halftone. The image processing are, for example, gamma correction, color conversion, and gradation processing. The processed image data is then transferred to an external device via network.

13 Claims, 13 Drawing Sheets

U.S. PATENT DOCUMENTS 7,046,399 B2 * 5/2006 Endo .................... 358/3.26
2004/0125410 A1 7/2004 Shirata et al.

FOREIGN PATENT DOCUMENTS

| | | |
|---|---|---|
| JP | 2000-333026 | 11/2000 |
| JP | 2001-211336 | 8/2001 |
| JP | 2001-251513 | 9/2001 |
| JP | 2002-112050 | 4/2002 |
| JP | 2002-199211 | 7/2002 |

OTHER PUBLICATIONS

U.S. Appl. No. 09/665,054, filed Sep. 19, 2000, Takahashi et al.
U.S. Appl. No. 09/693,987, filed Oct. 23, 2000, Kawamoto et al.
U.S. Appl. No. 09/706,783, filed Nov. 7, 2000, Miyazaki et al.
U.S. Appl. No. 09/706,781, filed Nov. 7, 2000, Oteki et al.
U.S. Appl. No. 09/725,569, filed Nov. 30, 2000, Namizuka et al.
U.S. Appl. No. 09/735,649, filed Dec. 14, 2000, Fukuda et al.
U.S. Appl. No. 09/748,240, filed Dec. 27, 2000, Yoshizawa et al.
U.S. Appl. No. 09/748,262, filed Dec. 27, 2000, Namizuka et al.
U.S. Appl. No. 09/749,819, filed Dec. 28, 2000, Fukuda et al.
U.S. Appl. No. 09/770,214, filed Jan. 29, 2001, Oteki et al.
U.S. Appl. No. 09/772,945, filed Jan. 31, 2001, Oteki et al.
U.S. Appl. No. 09/801,843, filed Mar. 9, 2001, Fukuda et al.
U.S. Appl. No. 09/940,589, filed Aug. 29, 2001, Inoue et al.
U.S. Appl. No. 10/086,897, filed Mar. 4, 2002, Yoshida.
U.S. Appl. No. 10/097,741, filed Mar. 15, 2002, Ohkawa.
U.S. Appl. No. 10/663,784, filed Sep. 17, 2003, Shirata et al.
U.S. Appl. No. 10/997,870, filed Nov. 29, 2004, Michiie et al.

* cited by examiner

| EDGE SEPARATION | 1 | 0 |
|---|---|---|
| HALFTONE DETECTION | 0 | Don't care |
| PROPERTIES/GENERAL (IMAGE TYPES) DETERMINATION | CHARACTER AREA | PATTERN AREA |

| EDGE SEPARATION | 1 | 1 | Don't care | 0 |
|---|---|---|---|---|
| HALFTONE DETECTION | 0 | 0 | 1 | 0 |
| COLOR DETERMINATION | 0 | 1 | Don't care | Don't care |
| PROPERTIES/IMAGE TYPES | BLACK CHARACTERS | COLORED CHARACTERS | HALFTONE | PATTERN OTHER THAN HALFTONE |

● : BLACK PIXEL
○ : WHITE PIXEL
× : Don't care

FIG. 17

| PROPERTIES/GENERAL (IMAGE TYPES) DETERMINATION | | | | |
|---|---|---|---|---|
| EDGE SEPARATION | 1 | 1 | 0 | OTHER THAN THE LEFT ITEMS |
| HALFTONE SEPARATION | 0 | 0 | 0 | |
| WHITE BACKGROUND SEPARATION | 1 | 1 | 1 | |
| COLOR SEPARATION | 0 | 1 | — | |
| PROPERTIES/GENERAL (IMAGE TYPES) DETERMINATION | BLACK CHARACTERS | COLORED CHARACTERS | WHITE BACKGROUND | PATTERN |

FIG. 18A

| 0 | 0 | -1 | 0 | 0 |
|---|---|---|---|---|
| 0 | 0 | 0 | 0 | 0 |
| -1 | 0 | 4 | 0 | -1 |
| 0 | 0 | 0 | 0 | 0 |
| 0 | 0 | -1 | 0 | 0 |

FIG. 18B

| 0 | 1 | 3 | 5 | 3 | 1 | 0 |
|---|---|---|---|---|---|---|
| 2 | 3 | 6 | 6 | 6 | 3 | 2 |
| 4 | 7 | 8 | 8 | 8 | 7 | 4 |
| 2 | 3 | 6 | 6 | 6 | 3 | 2 |
| 0 | 1 | 3 | 5 | 3 | 1 | 0 |

FIG. 18C

| 0 | 0 | 1 | 2 | 1 | 0 | 0 |
|---|---|---|---|---|---|---|
| 0 | 1 | 2 | 6 | 2 | 1 | 0 |
| 0 | 2 | 6 | 16 | 6 | 2 | 0 |
| 0 | 1 | 2 | 6 | 2 | 1 | 0 |
| 0 | 0 | 1 | 2 | 1 | 0 | 0 |

US 7,376,268 B2

IMAGE PROCESSING APPARATUS FOR TRANSMITTING IMAGE DATA TO AN EXTERNAL DEVICE

BACKGROUND OF THE INVENTION

1) Field of the Invention

The present invention relates to a technology for transmitting image data from an image reading device, such as a scanner, to an information processing terminal, such as a personal computer.

2) Description of the Related Art

It is now common to connect the image processing apparatuses to a network and use the image processing apparatuses from a computer (hereinafter, "PC") connected to a network. For example, some multifunction devices (devices that include the functions of copying machine, printer, scanner etc.), have a function to distribute image data read by a scanner to a PC connected to the multifunction device via the network.

This function is generally called a scanner distribution function and is disclosed in detail in Japanese Patent Application Laid-Open No. 2000-333026. In the scanner distribution function, scanning conditions are set via a copying machine or a PC, scanning is performed based on the set conditions, the image data obtained by the scanning is processed, and the image data processed is sent to the PC. This application discloses to send RGB (Red-Green-Blue) data in a scan box so that the PC can access the data in the scan box and display the RGB data.

Until the destination is a computer, display of the RGB data is possible. However, if the destination is other than the computer, say, printer, YMCK (Yellow-Magenta-Cian-blacK) data is required. This has been disclosed in detail in Japanese Patent Application Laid-Open No. 2000-333026.

It is also common to send image data from a scanner to a PC. In that case, a processing shown in FIG. 23 is performed. Namely, the image data is subjected to scanner γ correction, standard RGB (hereinafter, "sRGB") conversion, and finally converted into a format suitable to the destination, such as a PC.

Thus, conventionally, when sending the image data to the destination, the image data is processed or converted into a format suitable to the destination.

SUMMARY OF THE INVENTION

It is an object of the present invention to obtain a structure, which, when sending the image data to the destination, not only processes or converts the image data into a format suitable to the destination but also processes or converts the image data according to the content of the image data.

An image processing apparatus according to one aspect of the present invention includes a determining unit that determines image types in an image data corresponding to an image; an image area separation unit that separates the image into areas corresponding to each of the image types and generates area data corresponding to each of the areas; a memory which stores the image data and the area data in a correlated manner; an image processing unit that subjects a specific image data stored in the memory to one or more of gamma correction, color conversion, and gradation processing based on processing conditions set for the area data correlated with the specific image data; a conversion unit that converts a format of the image data processed by the image processing unit into a general-purpose format; and a transmission unit that sends the image data in the general-purpose format to an external device.

An image processing apparatus according to another aspect of the present invention includes an acquiring unit that acquires an image data corresponding to an image; a determining unit that determines image types in the image data; an image area separation unit that separates the image into areas corresponding to each of the image types and generates area data corresponding to each of the areas; a memory which stores the image data and the area data in a correlated manner; an image processing unit that subjects a specific image data stored in the memory to one or more of gamma correction, color conversion, and gradation processing based on processing conditions set for the area data correlated with the specific image data; a conversion unit that converts a format of the image data processed by the image processing unit into a general-purpose format; and a transmission unit that sends the image data in the general-purpose format to an external device.

A method of processing an image data corresponding to an image according to still another aspect of the present invention includes separating the image into areas corresponding to each of the image types and generating area data corresponding to each of the areas; subjecting an image data in a specific area to image processing including one or more of gamma correction, color conversion, and gradation processing based on a processing condition set for the area data in the specific area; converting a format of the image data image processed to a general-purpose format; and sending the image data in the general-purpose format to an external device.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 17 is a diagram illustrating image area determining rules for the image types (characters, white background, and patterns) in the image area separation section illustrated in FIG. 9;

FIGS. 18(A) to 18(C) are diagrams illustrating coefficients of filters for edge enhancement, strong smoothing, and weak smoothing to be used in a filter processing section illustrated in FIG. 8;

DETAILED DESCRIPTION

Exemplary embodiments of the image processing apparatus according to the present invention are explained below based with reference to the accompanying drawings.

A digital color copying machine having a function of distributing a read document image is explained below as an example of the image processing apparatus according to the first embodiment of the present invention.

Figure 1:
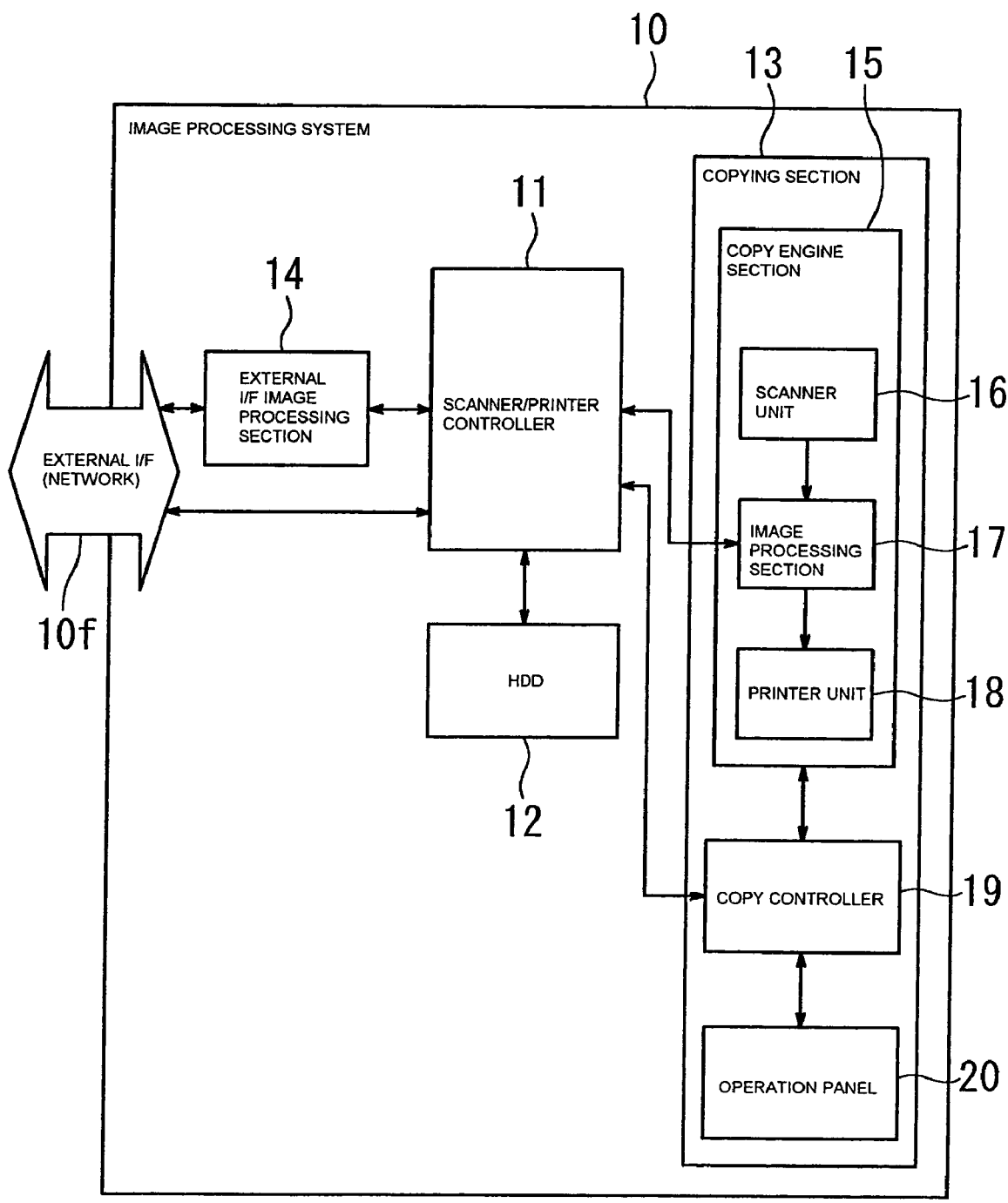
FIG. 1 is a block diagram schematically illustrating a system configuration of a digital color copying machine according to a first embodiment of the present invention.

FIG. 1 is a block diagram schematically illustrating a system configuration of the digital color copying machine according to the first embodiment.

An image processing system 10 shown in FIG. 1 as the digital color copying machine has a copying function and a scanner distribution function. As elements which realize the copying function, the image processing system 10 has a copying section 13, a system (scanner/printer) controller 11 which controls the entire system, and a hard disk drive (hereinafter, "HDD") 12 in which scanned images are stored. The copying section 13 has a copy engine section 15 including a scanner unit 16, an image processing section 17, and a printer unit 18, a copy controller 19, and an operation panel 20. The scanner unit 16 reads a document as color image data. The image processing section 17 processes the scanned image into image data of a form complying with a usage side. The printer unit 18 forms a copied image on a recording medium based on the image data so as to output the copied image. The copy controller 19 controls the copy engine section 15. The operation panel 20 is operated by a user in order to set processing conditions such as a copying mode and input a command operation.

The image processing system 10 further includes an external I/F image processing section 14 and an external I/F 10f as the elements which realize the scanner distribution function. The system (scanner/printer) controller 11, the HDD 12, and the operation panel 20 are provided as elements which commonly used also as the copying function.

The functions of the digital color copying machine including the above elements as well as their operations are explained in detail.

The operation relating to a processing at that time of using the copying function is explained.

When a document scanning unit using a CCD (photoelectric conversion element) scans a document, the scanner unit 16 generates digital image data having three color components including Red, Green, and Blue.

The RGB image data generated by the scanner unit 16 are input into the image processing section 17. The RGB image data are converted and corrected into image data which are used for outputting a copied image via the printer unit 18 at a subsequent stage.

Figure 2:
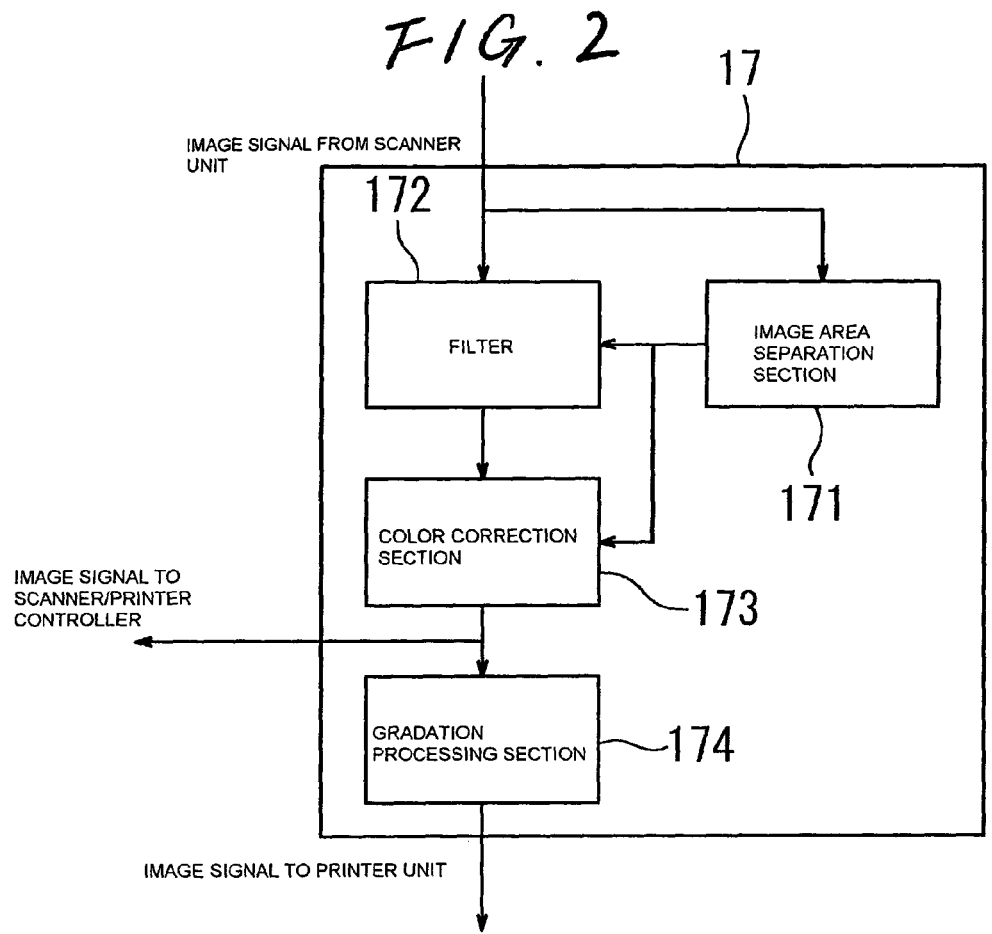
FIG. 2 is a diagram of an internal configuration of an image processing section illustrated in FIG. 1.

FIG. 2 illustrates the configuration of the processing section in the image processing section 17 in detail.

As shown in FIG. 2, the image processing section 17 includes an image area separation section 171, a filter 172, a color correction section 173, and a gradation processing section 174. The image area separation section 171 determines the RGB image data output from the scanner unit 16 as characters, photographs, colors, and halftone, and generates image area separated data representing their image areas. The filter 172 smoothens and enhances the RGB image data. The color correction section 173 converts the RGB image data into image data having four color components including Cyan, Magenta, Yellow, and Black. The gradation processing section 174 executes a gradation processing according to characteristics of the printer unit.

Figure 3:
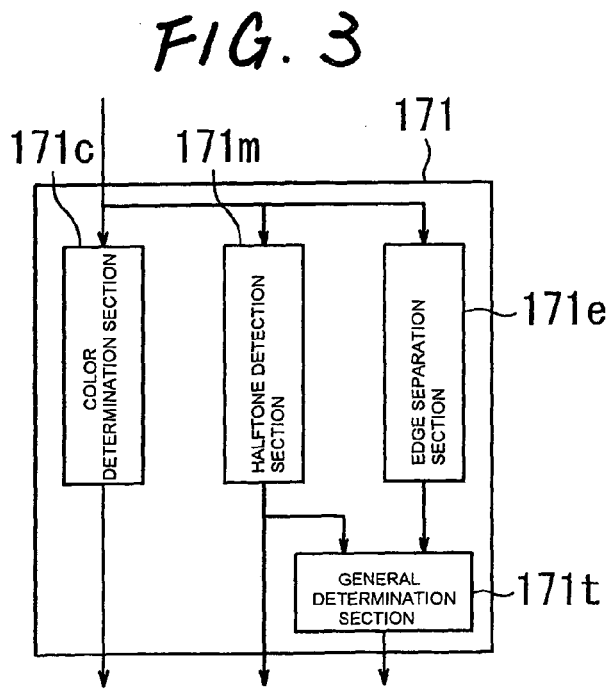
FIG. 3 is a diagram illustrating an internal configuration of an image area separation section illustrated in FIG. 2.

When an image to be processed has a different image types such as characters, photographs, colors, and halftone, the image area separation section 171 determines image areas of the respective image types and outputs them as image area separated data. In the first embodiment, as shown in FIG. 3, the image area separation section 171 includes a color determining section 171c, a halftone detecting section 171m, an edge separation section 171e, and a general determining section 171t.

The color determining section 171c determines whether a target pixel is chromatic or achromatic, and this determination can be made by applying a known unit having this function to this section (for example, see Japanese Patent Application Laid-Open No. 2000-125140 (paragraph [0126] to [0145], FIG. 16 to FIG. 18)).

The halftone detecting section 171m determines whether a target pixel is halftone or non-halftone, and the edge separation section 171e determines a target pixel is an edge or a non-edge. The halftone detection and edge separation can be carried out by applying known units having these functions to the sections (for example, see Japanese PatentApplication Laid-Open No. 10-108012 (1998) (paragraph [0011] to [0017], FIG. 2 to FIG. 5).

Figures 4, 5:
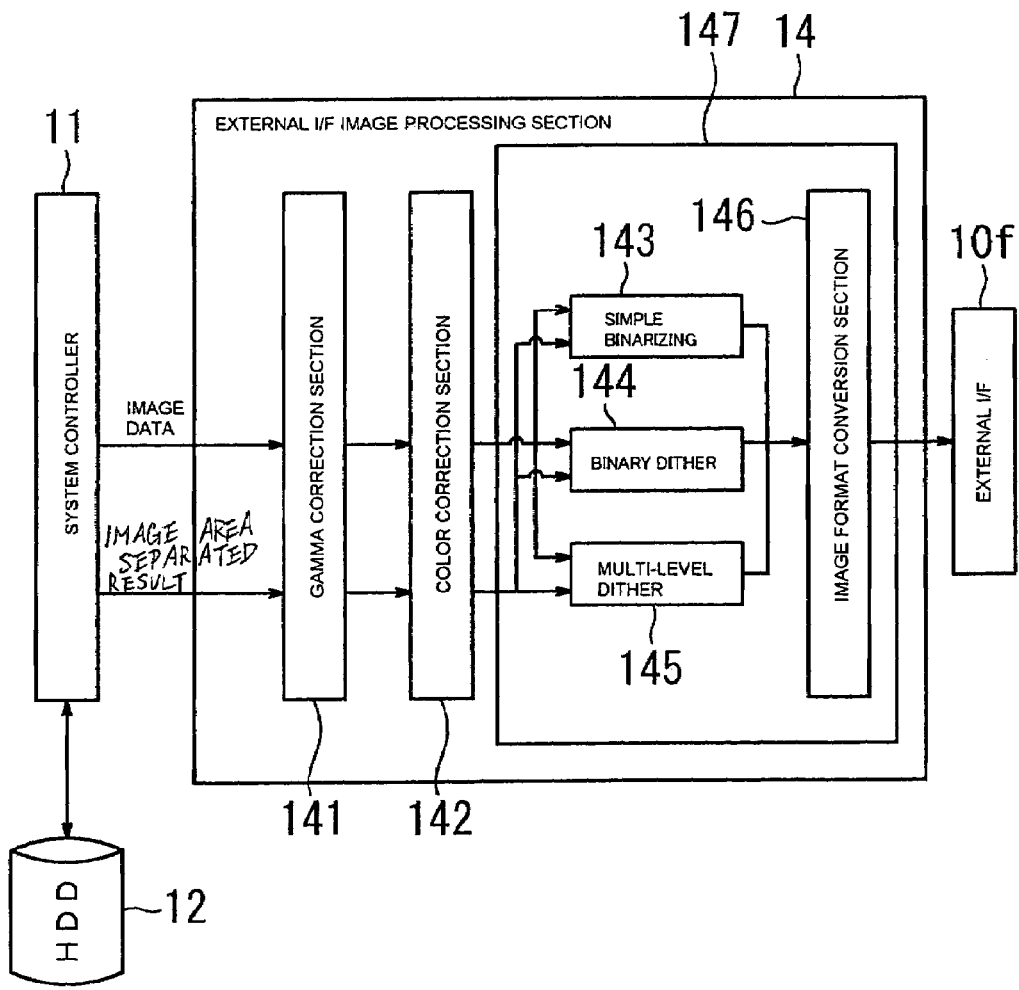
FIG. 4 is a diagram illustrating image area determining rules for image types (characters and patterns) in the image area separation section illustrated in FIG. 2.
FIG. 5 is a block diagram illustrating in detail a system configuration of a portion relating to a processing at the time of using a scanner distribution function of the image processing apparatus according to the first embodiment.

The general determining section 171t receives a judged result (1: halftone, 0: non-halftone) of the halftone detecting section 171m and a judged results (1: edge, 0: non-edge) of the edge separation section 171e so as to make a general determination as shown in FIG. 4. That is to say, when judged results are the edge separation (1) and the halftone detection (0), a character area signal is generated, and when the judged result is the edge separation (0), a photograph area signal is generated regardless of the result of the halftone detection. Although the above describes the "photograph" area, it substantially means an area which satisfies the above conditions, and this may be called a pattern area, but it is represented as the "photograph" area.

The image area separation section 171 generates a character/photograph determined signal, a color determined signal, and a halftone signal.

When a target pixel belongs to a character area, the filter 172 enhances the scanned image using the character/photograph determined signal output from the image separation section 171. When the target pixel belongs to the photograph area, it smoothens the scanned image and outputs an RGB signal to the color correction section 173.

The color correction section 173 converts the received RGB signal into a CMYK signal, and temporarily stores the converted CMYK signal in the HDD 12 via an operation of the system controller 11. This is because when a copy is printed out by using the scanned image, the document is avoided being re-read by the scanner or a sorting processing is executed if paper jam occurs and thus the printing is not ended properly When the scanned image data are stored into the HDD 12, the CMYK signal output from the color correction section 173 and the image area separated data (character/photograph determined signal, color determined signal, and halftone detected signal) from the image area separation section 171 are recorded as the stored data. The recorded image area separated data are used for an operation at the time of using the scanner distribution function, mentioned later. The scanned image data (CMYK signal) to be stored in the HDD 12 may undergo data compression so that a data quantity is reduced.

As the copying operation, the CMYK signal output from the color correction section 173 may be input directly into the gradation processing section 174, but when it is temporarily stored in the HDD 12 as mentioned above, the CMYK signal is taken out from the HDD 12 so as to be input into the gradation processing section 174. In the gradation processing section 174, the input CMYK signal undergoes the gradation processing (gamma correction, conversion into dither pattern, and the like) which complies with characteristics of the printer unit. The printer unit 18, which receives the processed CMYK signal, forms a copied image on a recording medium based on the CMYK signal so as to output the copied image.

The operation relating to the processing at the time, of using the scanner distribution function, to which a unit to be used at the time of distribution, is explained below.

It is an object of the present invention to distribute necessary data efficiently and optimize utilization of the distribution function by temporarily storing the scanned image (CMYK signal) into the storage unit (HDD), and by giving the correction and conversion processings, which conform to the image types included in the image, to the scanned image to be distributed at the time of using the scanner distribution function without degradation quality in terminals on a using side such as PC, work station (hereinafter, "WS"), and server.

For this reason, in the first embodiment, at the time of distribution, the external I/F image processing section 14 corrects and converts the scanned image data of the CMYK signal stored in the HDD 12 utilizing the image area separated data (characters/photograph determined signal, color determined signal, and halftone detected signal), which are generated by the image area separation section 171 and recorded together with the image data into the HDD 12.

The contents of the correction and conversion processings are as follows:

(1) to make a point of resolution properties of character portions in the image area, and to make the resolution properties and high gradation proprieties of the photograph portion compatible with each other;

(2) to improve image quality of the colored character portion; and (3) to improve image quality of the halftone pattern portion. Units for these contents are prepared.

FIG. 5 is a block diagram of the copying machine (see FIG. 1) illustrating in detail the system configuration of the portion relating to the processing at the time of using the distribution scanner function.

As shown in FIG. 5, the external I/F image processing section 14 includes a gamma correction section 141, a color correction section 142, and an external output processing section 147. The gamma correction section 141 executes gamma correction on the CMYK image data. The color correction section 142 corrects colors from CMYK into RGB. The external output processing section 147 converts the color-corrected RGB image data into data of general-purpose format such as joint photographic experts group (hereinafter, "JPEG") or Bitmap (hereinafter, "BMP").

With reference to FIG. 5, a flow of the image processing up to the distribution is explained below.

In the first embodiment 1, the distribution function is actuated by a command of a distribution request from the terminal such as PC, WS or a server via the external I/F 10f, and a specified file is taken out from the image data stored in the HDD 12. The image data undergo a necessary processing so as to be distributed to the terminal which makes the distribution request. In such a manner, the image processing is executed according to this procedure. The image processing is not limited to the exemplified embodiment, and the image processing may be executed according to a procedure which starts with the operation for reading a document via the scanner unit 16. Further, the operation of the scanner distribution function similar to the example may be performed by the command of the distribution request made by an input operation via the operation panel 20 in the copying machine.

When the distribution processing on the image data is instructed according to the command of the distribution request from the external terminal, the system controller 11 takes out the image data (if compressed image data, the image data are expanded and restored) and the image area separated data (character/photograph determined signal, color determined signal, and halftone detected signal) stored in the HDD 12. The system controller 11 inputs the data to the external I/F image processing section 14 in order to give the image processing to these areas as the distribution image data.

Figures 6, 7:
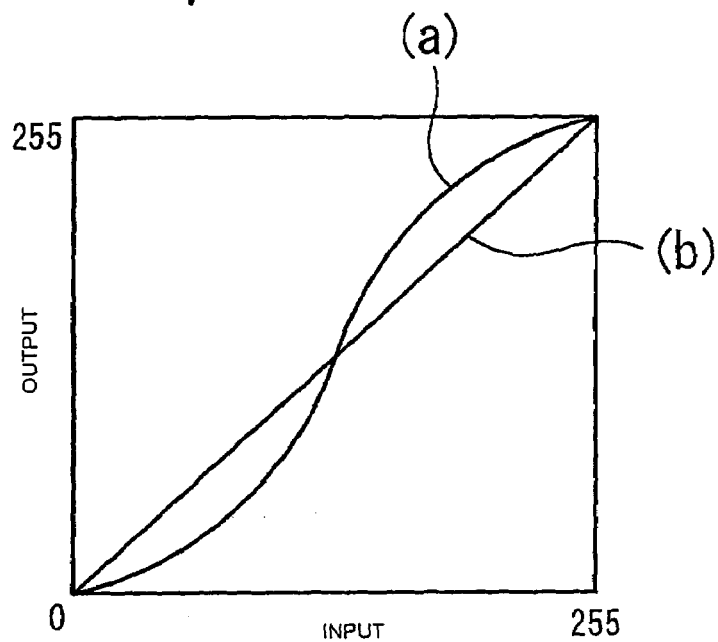
FIG. 6 is a diagram illustrating a correction value to be used for a gamma correction section illustrated in FIG. 5.
FIG. 7 is a diagram illustrating image area determining rules for the image types to be used for color correction of an external interface (hereinafter, "I/F") image processing section illustrated in FIG. 1.

When the CMYK image data and the character/photograph determined signal as the image area separated data are input into the gamma correction section 141, the gamma correction section 141 switches the setting of the processing conditions for the gamma correction based on the character/photograph determined signal. For example, in the image area of the character portion having the character determined signal, correction is made by using an approximately S-shaped gamma curve shown in FIG. 6(A), and black is enhanced, so that high resolution is obtained. In the image area of the photograph portion having the photograph determined signal, high gradation is maintained by using a linear gamma curve shown in FIG. 6(B). The processing conditions are switched so as to conform to the image areas of the character portions and the photograph portions in such a manner, so that the high quality of the entire image can be maintained.

The gamma-corrected CMYK image data are input into the color correction section 142. At this time, the character/photograph determined signal, the color determined signal, and the halftone detected signal which are the image area separated data are simultaneously input into the color correction section 142.

The color correction section 142 switches setting of the color conversion parameters at the time of conversion from the input CMYK image data into RGB image data to be distributed and output according to the three signals of the image area separated data. For example, three image data types such as colored characters, black characters, and halftone pattern are determined from the three types of image area separated data as shown in table of FIG. 7, and parameters for the color correction are switched according to the three determined types.

That is to say, in the pixel which is determined as colored character (edge separation (1), halftone detection (0), and color determination (1)), the CMYK image data are converted into the RGB image data with setting such that chroma becomes high.

In the pixel which is determined as black character (edge separation (1), halftone detection (0), and color determination (0)), the CMYK image data are converted into the RGB image data with setting such that respective values of RGB are equal with each other.

In the pixel which is determined as halftone pattern (when halftone detection (1), results of the edge separation and the color determination are ignored), the CMYK image data are converted into the RGB image data with setting of the parameters complying with the halftone pattern portion.

The CMYK image data are converted into the RGB image data, in which the processing on the character portion is varied from the processing on the photograph portion and colored characters and black characters are easily discriminated on the character portion. Further, the conversion is made on the halftone pattern portion with optimal setting, so that the RGB image data are output as image data having high image quality to the external output processing section 147.

The external output processing section 147 converts the RGB image data converted by the color correction at the former stage into image data which conform to the external I/F 10f. For this reason, as shown in FIG. 5, the external output processing section 147 has gradation processing sections 143 to 145, and an image format conversion section 146. When the image data undergo the process in the external output processing section 147 and are output to the external I/F 10f, the format of the image data can be arbitrarily specified on a capturing side such as PC, WS, and server, and for example, the image data are generally converted into image data of general-purpose format such as tagged image file format (hereinafter, "TIFF") and JPEG. The data converted according to the specified format are distributed to the terminals connected with the external I/F 10f.

Details of the function of the external output processing section 147 relating to the distribution of the scanned image are explained.

The external output processing section 147 has a simple binarizing section 143, binary dither section 144, and a multi-level dither section 145 as units which executes the gradation processing on the input distribution image data. The character/photograph determined signal as the image area separated data as well as image data is input into the respective processing sections.

One of the gradation processings executed here is a conversion processing of converting the image data stored in the HDD 12 into binary data of a format convenient to a situation where a user wants to recognize characters in the image data using optical character reader (hereinafter, "OCR") or the like on the terminal side.

The character/photograph determined signal, which is related with the data which undergo the processing in the color correction section 142, is used for the data, so that a binarizing threshold value is set low for the image data in the character image area, and the image data undergo the binarizing processing in the simple binarizing section 143. When the binarizing threshold value is set in the character image area in such a manner, reproducibility of the character portion including characters with low density can be improved, thereby heightening a recognition rate of the OCR. Further, multi-value data are binarized so that a quantity of data can be reduced, and compressibility of the image data is improved, thereby further reducing a quantity of data. As a result, data transfer time is shortened and usage efficiency of a memory in a transfer destination is reduced. Since the halftone processing is not executed, hardware can be small.

When the gradation processing sections of the binary dither processing 144 and the multi-level dither 145 are used, dither patterns are changed and the dither processing is executed on the image data of the character image area and the image data of the photograph image area by using the character/photograph determined signal relating to the data which undergo the processing in the color correction section 142. That is to say, the binary dither processing 144 is applied to the character image area of the image data, and the multi-level dither 145 is applied to the photograph image area, so that the gradation properties of the photograph portion is maintained without degrading the resolution degree of the character portion.

After the gradation processing is executed, the image format conversion section 146 converts the image format into a general-purpose format such as TIFF or JPEG, so that the scanned image can be seen or edited easily on the terminals as the distributing destinations.

According to the image processing apparatus of the first embodiment, when the stored document image is distributed, the processing conditions which conform to the image types are set for the image data in the image areas represented by the image area separated data relating to the distribution image, so that at least one of the gamma correction, the color conversion, and the gradation processing is executed. As a result, the utilization of the distribution function can be optimized without degrading the quality of the image to be utilized on the distributing destinations. Further, since at least one image type relating to the image area separated data is selected from the character/photograph, the color, and the presence of halftone, the invention according to the first aspect can be carried out in a more effective mode.

According to the image processing apparatus of the first embodiment, the gamma correction which complies with the image areas is carried out according to the image area separated data of characters and photographs, so that the high resolution is obtained in the image area of the character portion, and the high gradation is maintained in the image area of the photograph portion. As a result, the high quality of the entire image can be maintained.

According to the image processing apparatus of the first embodiment, the color correction which complies with the image areas is carried out according to the image area separated data of the characters/photographs, the color, and the presence of halftone, so that the high image quality can be maintained in the colored character portion, the black character portion, and the halftone pattern portion.

According to the image processing apparatus of the first embodiment, the gradation processing which complies with the image areas is carried out according to the image area separated data of the character and photograph, so that a quantity of data can be reduced by applying the processing which produces good reproducibility to the image area of the character portion. Suitable dither patterns are used for the image data in the character image area and the image data in the photograph image area, so that the gradation properties of the photograph area can be maintained without reducing the resolution degree of the character portion.

According to the image processing apparatus of the first embodiment which can produce the above effects, the performance can be improved even in the image processing apparatus which is combined by the copying function.

The second embodiment of the present invention is explained below. The second embodiment describes an example of the apparatus having a function of distributing a scanner read document image.

Figure 8:
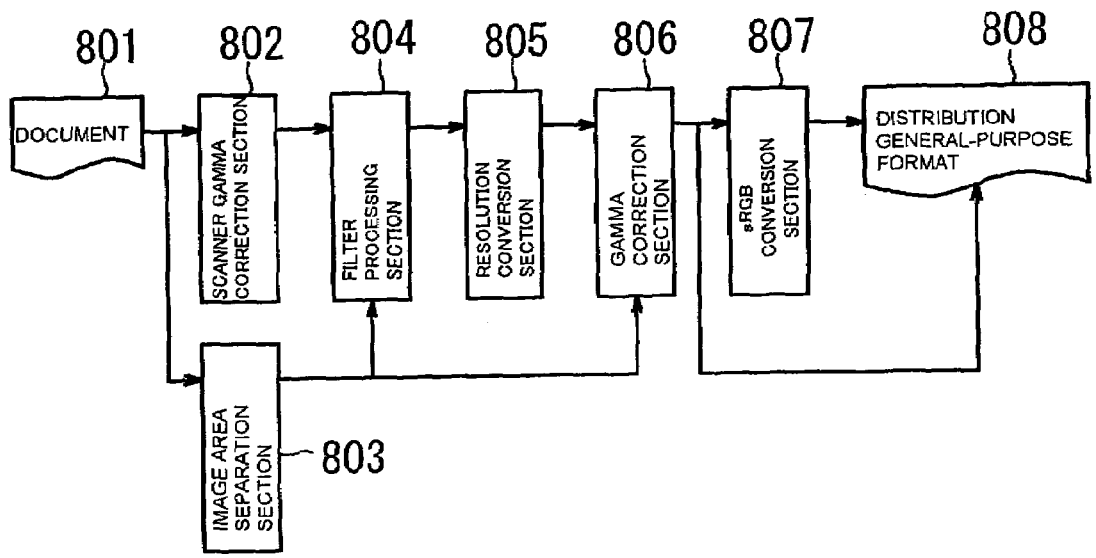
FIG. 8 is a block diagram schematically illustrating a system configuration of the image processing apparatus according to the second embodiment of the present invention.

FIG. 8 is a block diagram schematically illustrating the system configuration of the image processing apparatus of the second embodiment.

FIG. 8 illustrates only elements necessary for realizing the scanner distribution function. For example in the case of the image processing system of the second embodiment having the copying function as the complex function, although the processing in the scanner section is common to both the functions, a processing necessary for print output to a paper medium should be added.

As the elements which realize the scanner distribution function in the system of the second embodiment, as shown in FIG. 8, the system has a scanner gamma correction section 802, a filter processing section 804, a resolution conversion section 805, a gamma correction section 806, a sRGB conversion section 807, a distribution general-purpose format conversion section 808, and an image area separation section 803. The scanner gamma correction section 802 corrects scanner gamma for input document image data from the scanner (not shown) as an input unit of read image data of a document 801. The filter processing section 804 adjusts a data value of the input image data using a filter. The resolution conversion section 805 converts resolution of the image data after the filter processing. The gamma correction section 806 executes the gamma correction processing on the image data whose resolution is converted. The sRGB conversion section 807 converts the gamma-corrected RGB image data into sRGB image data of a standard color space. The distribution general-purpose format conversion section 808 converts the format of the converted sRGB image data into a distribution format such as JPEG or BMP. The image area separation section 803 separates the image areas of the input document image data according to image types and inputs the area separated data as control data to be transmitted to the filter processing section 804 and the gamma correction section 806.

The function and operation of the image processing system having the above elements are detailed below.

When the document 801 is read, the reading unit (scanner) using the CCD (photoelectric conversion element) reads the set document, and captures images as data in which colors are separated into Red, Green, and Blue.

In the operation of the scanner distribution function in the second embodiment, since it is not necessary to output the data onto paper, the scanner gamma processing is executed, and after the filter processing, the resolution conversion processing, and the gamma processing are executed based on information from the image area separation section 803, a format of the data is converted into a general-purpose format, or optimum choromaticness is reproduced on a monitor of a PC. For this reason, after the RGB data is converted into the sRGB data, the sRGB data are converted into image data of a general-purpose format by the distribution general-purpose format conversion section 808 so as to be distributed. This operation is performed for each document. In the case of the complex machine, after the scanned image data at the time of using the copying function undergo the scanner gamma processing, and the filter processing, they undergo the color correction processing and a variable power processing, not shown.

In the scanner distribution function of the second embodiment, when the document image, which includes image areas for different image types such as characters, white background, and patterns, is to be distributed, degradation of the quality in some types of the images is prevented. The degradation is such that it is hard to read characters on the terminals of the distributing destination, and white background is colored. In order to prevent those degradations, the scanned image to be distributed undergoes the correction and conversion processings which conform to the image types (characters, white background, and pattern) included in the image.

The image area separation section 803 which separates the scanned image into the image areas for the image types as the unit necessary for this method is concretely explained below.

Figure 9:
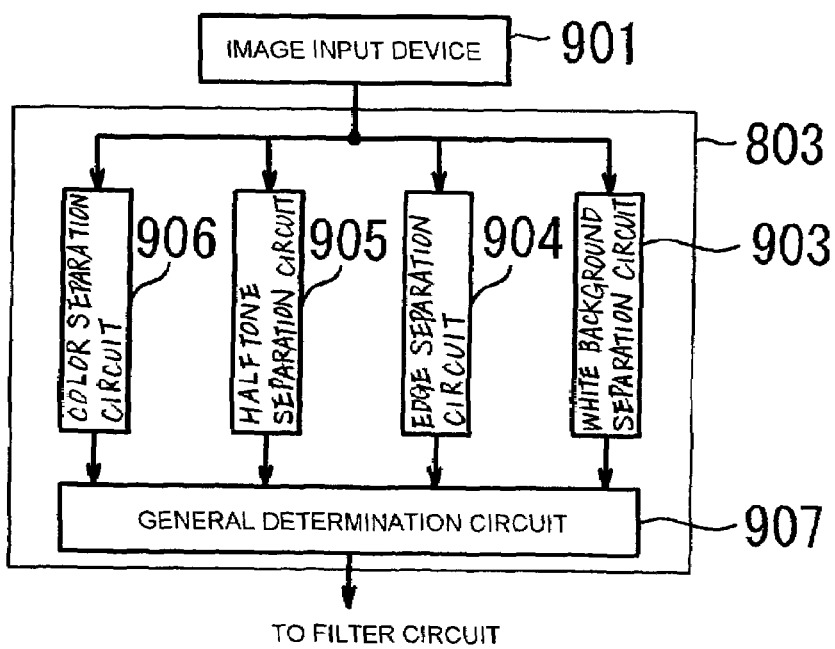
FIG. 9 is a diagram illustrating the internal configuration of the image area separation section illustrated in FIG. 8.

FIG. 9 illustrates in detail a configuration of the image area separation section 803 shown in FIG. 8.

In FIG. 9, a white background separation circuit 903 detects an image area of a white background from the image data obtained by scanning the document, and an edge separation circuit 904 detects a character edge from the image data obtained by scanning the document. A halftone separation circuit 905 detects an image area of halftone from the image data obtained by scanning the document, and a color separation circuit 906 detects a chromatic/achromatic portion from the image data obtained by scanning the document. A general determining circuit 907 outputs an image area separated result based on the detected results of the separation circuits 903 to 906.

As the edge separation circuit 904, the halftone separation circuit 905, and the white background separation circuit 903, conventional methods in such kinds of image processing can be adopted, and for example, a method disclosed in Japanese Patent Application Laid-Open No. 10-108012 (1998) can be adopted. Its outline is explained below.

Figure 10:
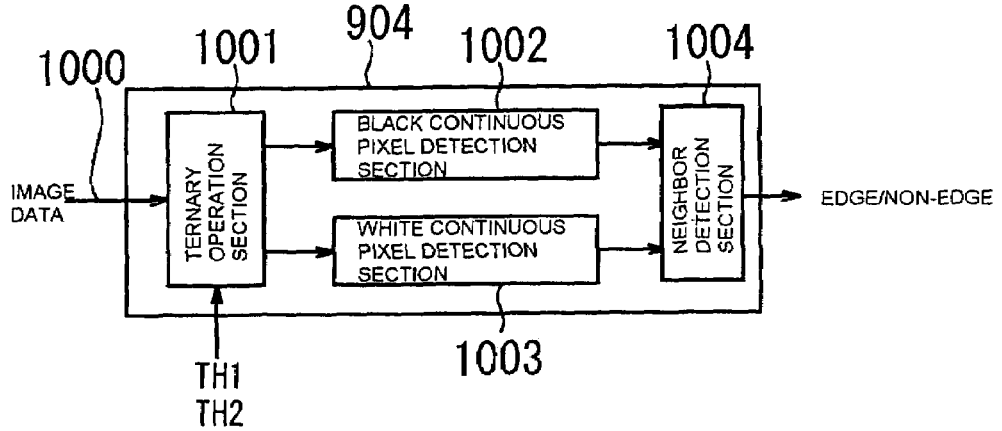
FIG. 10 is a diagram illustrating an internal section of an edge separation circuit illustrated in FIG. 9.

The character area has mostly pixels with high level density and pixels with low level density (hereinafter, "black pixels" and "white pixels"), and the black pixels and the white pixels are connected on the edge portion. The edge separation circuit 904 detects a character edge based on connection of the black pixels and the white pixels. FIG. 10 illustrates the edge separation circuit 904 according to this detecting principle.

As shown in FIG. 10, the edge separation circuit 904 has processing sections including a ternary processing section 1001, a black continuous pixel detecting section 1002, a white continuous pixel detecting section 1003, and a neighborhood detecting section 1004. The ternary processing section 1001 performs a ternary operation (white pixel<TH1, TH1≦halftone pixel<TH2, TH2≦black pixel) on an input image signal 400 using two kinds of threshold values TH1 and TH2. The threshold values TH1 and TH2 can be set to 20 and 80, respectively, when, for example, the input image signal is represented by 256 tones (0=white) from 0 to 255.

Figure 11A:
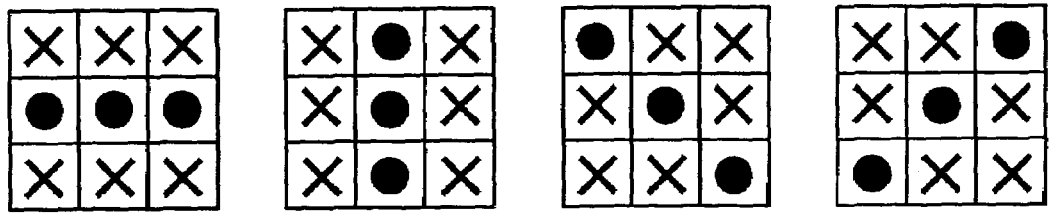
FIGS. 11(A) and 11(B) are diagrams of examples of patterns to be used for a pattern matching processing of the edge separation illustrated in FIG. 10.
Figure 11B:
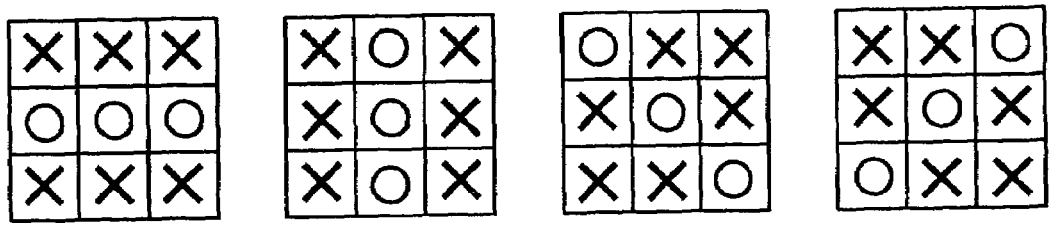

The black continuous pixel detecting section 1002 detects a portion where the black pixels are connected from the image signal which undergoes the ternary operation, and the white continuous pixel detecting section 1003 detects a portion where the white pixels are connected from the image signal according to pattern matching. In the second embodiment, patterns of 3×3 pixels shown in FIG. 11 are used for the pattern matching. The black continuous pixel detecting section 1002 detects target pixels which match with any one of the four patterns shown in FIG. 11(A) (in this example, central pixels of 3×3 pixels) as the black continuous pixels. Similarly the white continuous pixel detecting section 1003 detects target pixels (central pixels of 3×3 pixels) which match with any one of four patterns shown in FIG. 11(B) as the white continuous pixels.

The neighborhood detecting section 1004 checks whether the black continuous pixels and the white continuous pixels are present in neighborhood based on the detected results of the black continuous pixel detecting section 1002 and the white continuous pixel detecting section 1003, so as to determine an edge area and a non-edge area. Concretely, when one or more black continuous pixels and white continuous pixels are present in each block with a size of 5×5 pixels, the neighborhood detecting section 1004 determines the block as an edge area, and when not, it detects the block as a non-edge area. The neighborhood detecting section 1004 outputs "1" according to the pixels in the block determined as the edge area, and outputs "0" according to the pixels in the block determined as the non-edge area.

Figure 12:
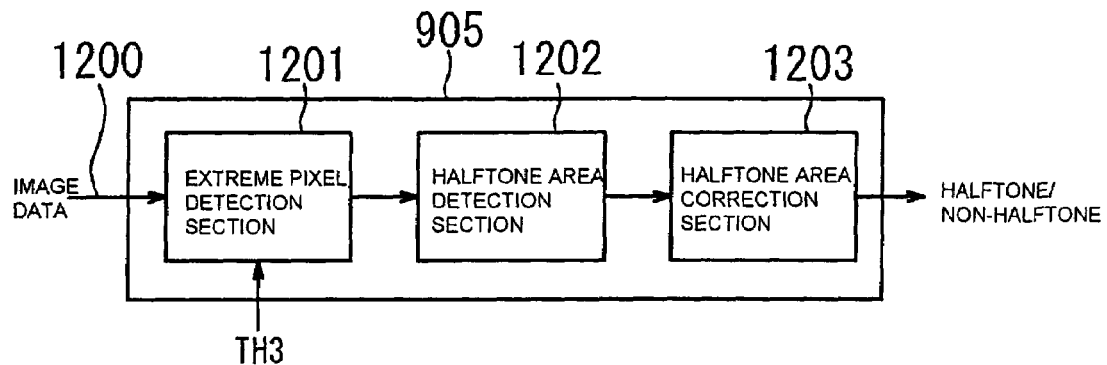
FIG. 12 is a diagram illustrating an internal configuration of a halftone separation circuit illustrated in FIG. 7.

In the halftone image area, pixels with high density value and pixels with low density value periodically appear in an alternative manner. The halftone separation circuit 905 detects the extreme pixels with high density value or with low density value so as to discriminate the halftone area. FIG. 12 illustrates an example of the halftone separation circuit 905.

Figure 13:
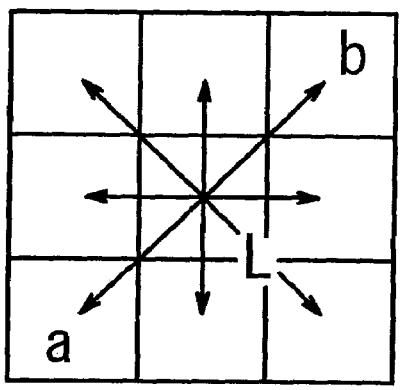
FIG. 13 is a diagram for explaining a method of detecting an extreme pixel in a halftone separation processing illustrated in FIG. 12.

The halftone separation circuit 905 is explained with reference to FIG. 12. Image data 1200 are input into an extreme pixel detecting section 1201. The extreme pixel detecting section 1201 detects an extreme pixel according to an operation. In the second embodiment, as shown in FIG. 13, when a central pixel of 3×3 pixels is regarded as a target pixel and when the following conditions A and B are satisfied simultaneously, the target pixel is detected as the extreme pixel.

Condition A: the density level (L) of the central pixel is higher or lower than the other surrounding pixels.

Condition B: the density level (L) of the central pixel and density levels (a and b) of pair pixels on a diagonal with the central pixel being on the center of the diagonal establish the following relationship in all the pairs;

$|2 \times L - a - b| > TH3$

TH13 is a fixed threshold value.

When one or more extreme pixels detected by the extreme pixel detecting section 1201 are present in a block where 4×4 pixels is regarded as one unit, the halftone area detecting section 1202 determines the block as a halftone candidate area. When no extreme pixel is present in a block, the extreme pixel detecting section 1201 detects the block as a non-halftone candidate area.

Upon reception of the results of determining the blocks as the halftone candidate area, a halftone area correction section 1203 determines final halftone/non-halftone.

Figure 14:
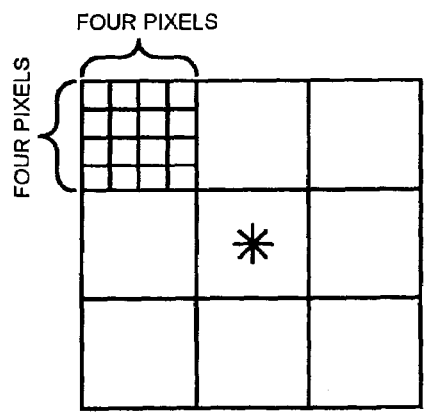
FIG. 14 is a diagram for explaining a halftone area correction method in the halftone separation processing illustrated in FIG. 12.

In the second embodiment, as shown in FIG. 14, when four or more blocks are the halftone candidate area in blocks of 3×3 in which a target block (4×4 pixels) is a center, the target block is determined as the halftone area, and when not, the target block is determined as the non-halftone area. "1" is output according to the pixels in the block determined as the halftone area, and "0" is output according to the pixels in the block determined as the non-halftone area.

Figure 15:
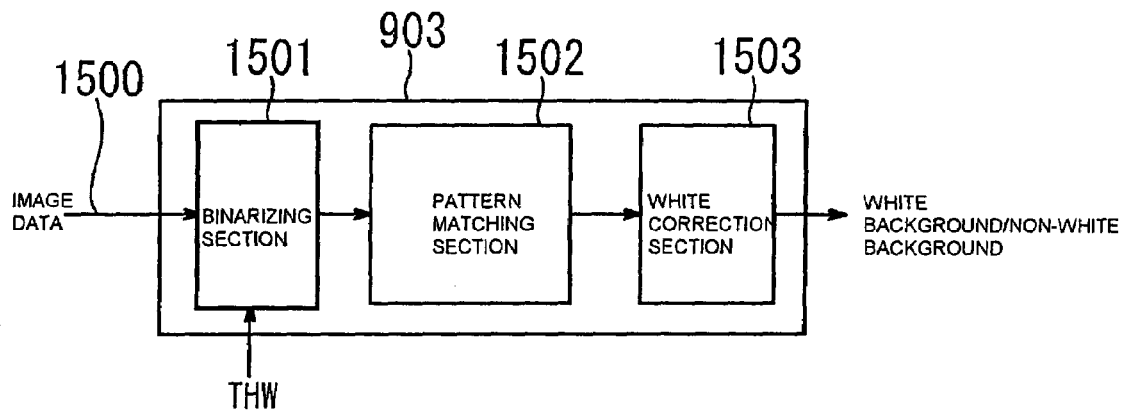
FIG. 15 is a diagram illustrating an internal configuration of a white background separation circuit illustrated in FIG. 9.

The whit background separation circuit 903 determines whether a background of the input image is white, and a circuit shown in FIG. 15 can be adopted. As shown in FIG. 15, the binarizing section 1501 binarizes input image data 1500 into the white pixels and the black pixels using the threshold value THW, and the pattern matching section 1502 detects a white pixel mass of 4×1 pixels or 1×4 pixels as a white candidate block by each pixel block of 4×4 pixels from the binarized image data. A white correction section 1503 finally determines the white candidate block as white background or non-white background. In the determining procedure, a determination is made whether the target white candidate block is the white background area based on whether the white candidate blocks are present uniformly in a peripheral area (9×9 block) where the target block (4×4pixels) being centered. Thereafter, "1" is output according to the pixels in the block determined as the white background area, and "0" is output according to the pixels in the block determined as the non-white background area.

The color separation circuit 906 determines whether the input image data are chromatic or achromatic, and a conventional method in this kind of the image processing can be adopted. For example, a method disclosed in Japanese Patent Application Laid-Open no. 2000-125140 (paragraph [0126] to [0145], FIG. 16 to FIG. 18) can be adopted. Its outline is explained below.

Figure 16:
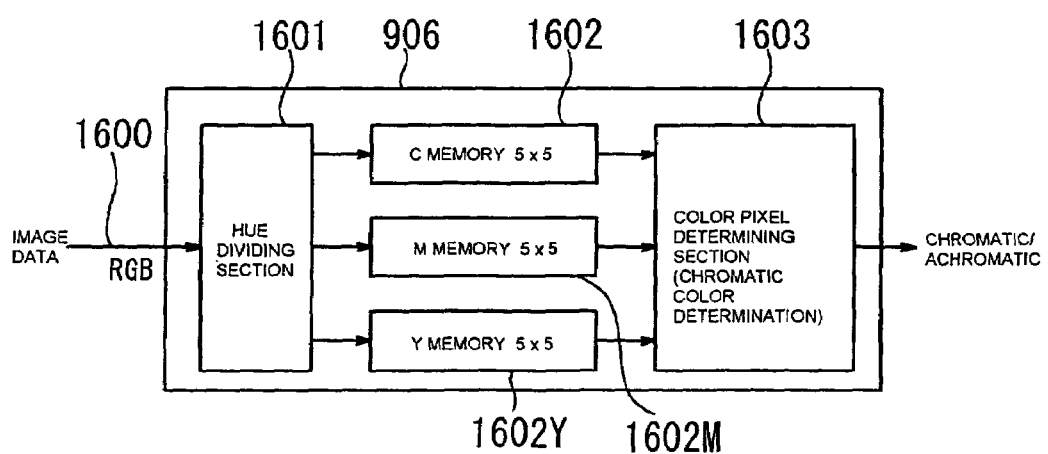
FIG. 16 is a diagram illustrating an internal configuration of a color separation circuit illustrated in FIG. 9.

FIG. 16 illustrates the color separation circuit 906, and as shown in the drawing, it includes a hue dividing section 1601 which divides hue of the input RGB image data, 5×5 line memories 1602C, M and Y which store hue divided outputs C, M and Y for five lines, and a color pixel determining section 1603 which determines whether RGB image data are achromatic (black pixels) or chromatic (color pixels) based on the stored data in the line memories 1602C, M and Y. The color pixel determining section 1603 determines color pixels based on a counted value obtained by counting planes of C, M, and Y independently and on a result of executing predetermined pattern matching on a pixel (color pixel) portion where all the 5×5 line memories 1602 C, M, and Y are "1" or other than "0". The color pixel determining section 1603 outputs "1" according to the pixels determined as chromatic pixels (color pixels), and outputs "0" according to pixels determined as achromatic pixels (black pixels).

The general determining circuit 907 makes a general determination based on the separated results (1, 0) obtained from the separation circuit according to the four image properties (image type). This determination is made according to rules shown in FIG. 17.

That is to say, when the determined results are the edge separation (1), the halftone separation (0), the white background separation (1), and the color separation (0), a black character area signal is generated. When the determined results are the edge separation (1), the halftone separation (0), the white background separation (1), and the color separation (1), a colored character area signal is generated. When the determined results are the edge separation (0), the halftone separation (0), and the white background separation (1), a white background area signal is generated. When the determined results are other than the black character area, the white character area, and the white background area, a pattern area signal is generated. The pattern area signal can be output as a pattern signal of halftone by attaching separated data from the halftone separation circuit 905.

The respective signals of the black character area, the colored character area, the white background area, and the pattern area determined by the general determining circuit 907 are transmitted as the image area separated data output from the image area separation section 803 to the filter processing section 804 and the gamma correction section 806 so as to be used as control signals for adjusting the image data, mentioned later.

The embodiment of the present invention relating to the adjustment of the image data in the filter processing section 804 is explained below. Respective types of filters are prepared in the filter processing section 804, and the filters which conform to the respective image types are used, so that the filter processing of adjusting the image quality is executed. In order to execute the process, the image area separated data obtained by separating the image areas according to the image types output from the image area separation section 803 are utilized.

When the image area separation section 803 determines a certain image area as a character portion (in FIG. 17, image areas of black character and colored character), this portion undergoes an edge enhancing filter processing using a filter having coefficients shown in FIG. 18(A). When a certain image area is determined as a pattern portion having halftone, this portion undergoes a strong smoothing filter processing using a filter having coefficients shown in FIG. 18(B), for example, in order to remove occurring moire. The other portions undergo a weak smoothing filter processing using a filter having coefficients shown in FIG. 18(C), for example.

Figure 19:
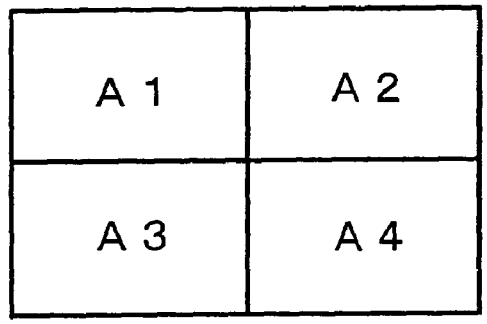
FIG. 19 is a diagram for explaining a processing method in a resolution conversion section illustrated in FIG. 8.

After the filter processing section 804 adjusts the image quality using the image area separated data, the resolution conversion section 805 decreases the resolution to desired resolution. For example, when the resolution is reduced by ½ from 600 dots per inch to 300 dots per inch, an averaging/thinning processing is executed by a predetermined pixel block unit. For example, an average is obtained by a pixel block unit represented by A1 to A4 in FIG. 19, and the thinning is executed so that the resolution is converted.

When the resolution at the time of reading the image by the scanner is 600 dpi, after the image data whose resolution is reduced is gamma-corrected by the gamma correction section 806, gamma-corrected RGB information directly undergoes the final processing using a multi-value general-purpose format compressor of the distribution general-purpose format conversion section 808, or after the gamma-corrected RGB information is converted into sRGB information, it undergoes the final processing using the multi-value general-purpose format compressor. The processing to be given to the distribution image data is optimized based on the result of the image area separation section 803, so that the quality of the image to be distributed can be improved.

Another embodiment of the present invention relating to the adjustment of the image data in the filter processing section 804 is explained. Also in this embodiment, when the image data are captured by the scanner, the processings which conform to the respective image areas are executed based on the separated results obtained from the image area separation section 803.

Figure 20:
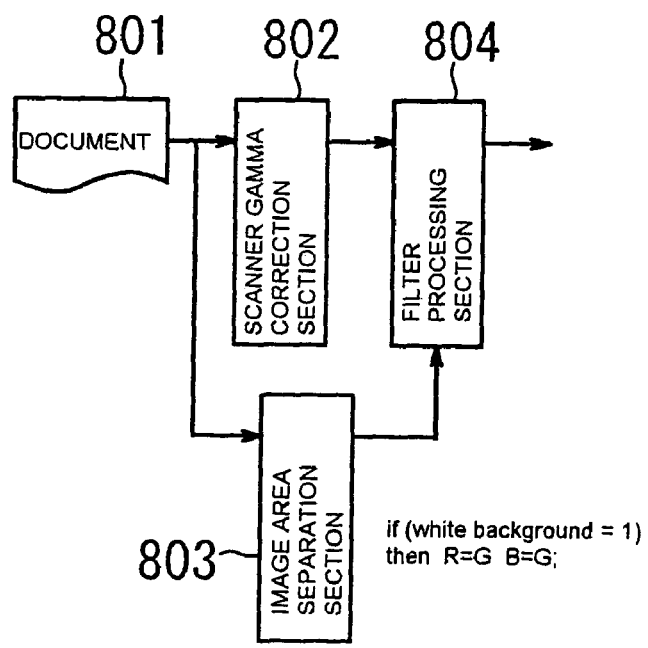
FIG. 20 is a block diagram of a system configuration portion relating to the image processing for an image area of a black character in the image processing apparatus according to the second embodiment.

That is to say, the filter processing section 804 executes a processing of arranging RGB values of the scanned image data undergoing the scanner gamma correction processing so that they are equal with each other (R=G=B) on the portion determined as the black character area by the image area separation section 803 (see FIG. 17) as shown in a block diagram of FIG. 20. The processing of arranging the RGB values is executed, so that dispersion of color on the portion determined as the black character area can be reduced, and the quality of the character image can be improved.

After the processing of arranging the RGB values is executed, the character image area undergoes the processings after the edge enhancing processing so as to be distributed. In this distribution processing, when the PC terminal utilizing the received distribution image data again captures the image data into the image processing system so as to be output onto paper, the RGB values of the black character area are previously arranged so as to be equal with each other. For this reason, when the black characters can be detected comparatively easily by carrying out the color conversion on the image data.

In the conventional distribution processing, image data are not processed particularly for characters by detecting the black character area in order to output the image data on paper. For this reason, the image quality of the distribution image data output on the paper of the distributing destination is inferior to the image in the character area which is copied and output on the complex machine side having the scanner distribution function, and thus it is hard to see the image data. As described the method of the second embodiment, however, since the black character image area undergoes the processing for the black characters so that the image is distributed, the image quality of the characters to be output on the distributing destination becomes remarkably better than black characters which do not undergo any processing.

Another embodiment of the invention, which relates to adjustment of the image data executed in the gamma correction section 806 in order to improve the image quality in the character image area, particularly the black character image area, is explained below. In this embodiment, when the image data are captured by the scanner, the processing which complies with the respective image areas is executed based on the separated results obtained by the image area separation section 803.

Figure 21:
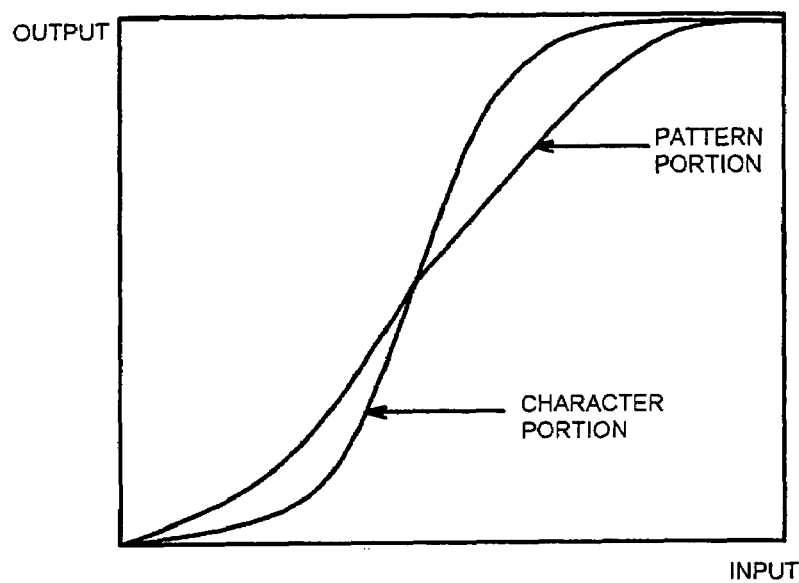
FIG. 21 is a diagram of a correction value to be used for the gamma correction section illustrated in FIG. 8.

Gamma correction properties which conform to the character portion is used for the portion (see FIG. 17) determined as the black character (colored character) image area by the image area separation section 803. In the second embodiment, the setting of the processing conditions in the gamma correction for the RGB image data in the gamma correction section 806 is switched by the character/pattern separated signal as the image area separated data input from the image area separation section 803. For example, the image area of the character portion having the character separated signal is gamma-corrected by using a gamma curve having approximately S-shaped properties specified as the character portion in FIG. 21, and black is enhanced, thereby obtaining high resolution. On the portion determined as the pattern image area (see FIG. 17), high resolution is maintained by using a gamma curve having approximately linear properties specified as the pattern portion in FIG. 21. The processing conditions are switching so as to conform to the respective areas on the character portion and the photograph portion, so that the high quality of the entire image can be maintained.

After the gamma correction processing is executed in such a manner, the RGB image data undergo the processings after the sRGB conversion processing so as to be distributed. When this distribution processing is executed, the quality of the character image can be improved on the PC terminal which utilizes the received distribution image data.

Another embodiment of the present invention relating to the adjustment of the image data executed by the filter processing section 804 is explained. In this embodiment, when the image data are captured by the scanner, the processings which conform to the respective image areas are executed based on the separated results obtained from the image area separation section 803.

Figure 22:
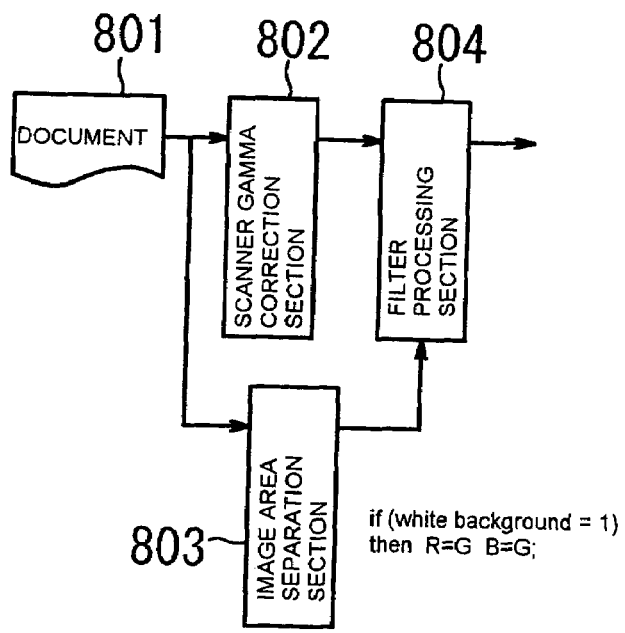
FIG. 22 is a block diagram of a system configuration portion relating to the image processing for an image area of a white background in the image processing apparatus according to the second embodiment.
Figure 23:
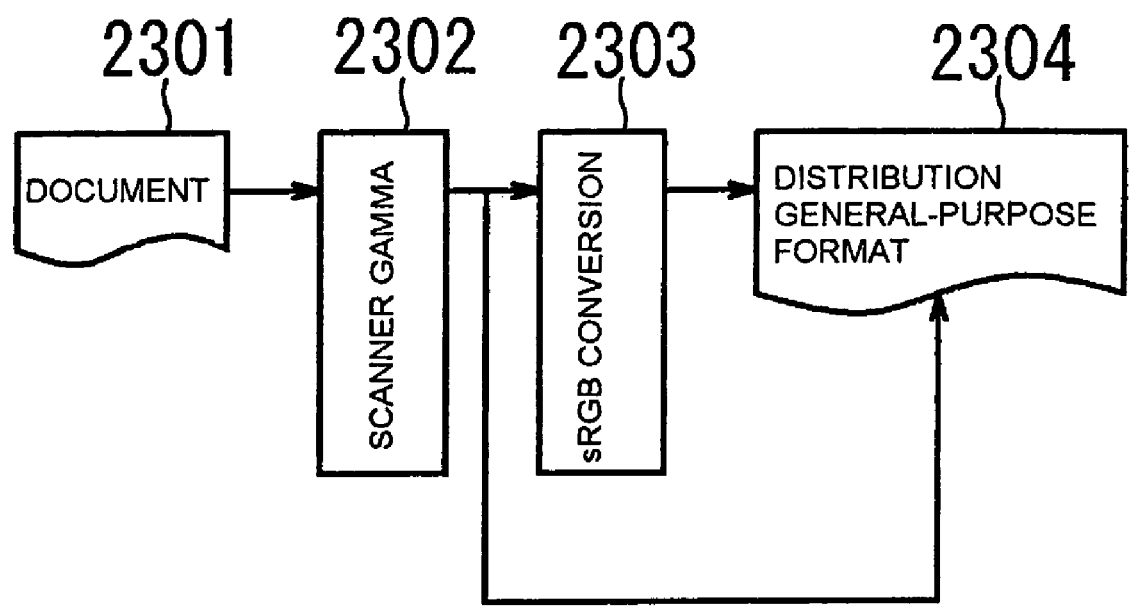
FIG. 23 is a block diagram schematically illustrating a system configuration of a conventional image processing apparatus having a scanner distribution function.

That is to say, on the portion determined as the white background image area (see FIG. 17) by the image area separation section 803, as shown in a block diagram of FIG. 22, the RGB values of the scanned image data undergoing the scanner gamma correction processing are arranged so as to be equal with each other (R=G=B) in the filter processing section 804. For example, when the gamma correction processing is executed thereafter, the gamma correction is skipped by setting the processing condition. When the RGB values are arranged and the gamma processing is skipped, colorings and color shadings on the portion determined as the white background image area can be reduced, so that the quality of the background image can be improved.

After the processing of arranging the RGB values is executed in such a manner, the white background image area undergoes the processings from the sRGB conversion processing downward so as to be distributed. In this distribution processing, when the image data are again captured into the image processing system and are output onto paper on the PC terminal which utilizes the received distribution image data, the RGB values on the white background area are previously arranged so as to be equal with each other. For this reason, when the white background area can be detected by the color conversion of the image data comparatively easily.

In the conventional distribution processings, image data are not processed particularly for a white background by detecting a white background area in order to output the image data on paper. For this reason, the quality of the distribution image data output on the paper of the distribution destination is inferior to the image in the white background area which is copied and output on the complex machine side having the scanner distribution function, and thus it is hard to see the image data. As described the method of the second embodiment, however, since the white background image area undergoes the processing for the white background so that the image is distributed, the quality of the characters to be output on the distributing destination becomes remarkably better than image data which do not undergo any processing.

According to the image processing apparatus of the second embodiment, when the scanned image is distributed, the distribution image is separated into image areas according to image types, and the processing conditions which conform to the image types are set for the image data in the separated image areas so that the image quality is adjusted.

The format of the adjusted data is converted into a general-purpose image format, so that the data are distributed. For this reason, when the image data are utilized on the distributing destination, the image quality is not degraded, and thus the high quality can be maintained.

According to the image processing apparatus of the second embodiment, the image quality is adjusted by the filters, so that the image data can conform to various image types easily.

According to the image processing apparatus of the second embodiment, the RGB values in the separated black character image area are adjusted so as to be equal with each other, so that the color dispersion on the portion determined as the black character image area can be reduced and the image quality of the character portion in the distribution image can be improved. Further, when the distribution image is again output onto paper, since the RGB values are previously arranged on the character portions, the character portion can be easily recognized in the image processing for output. As a result, the high-quality image can be output.

According to the image processing apparatus of the second embodiment, the gamma correction of adjusting the separated character image area (enhancing black) in order to provide clear characters is executed, so that the quality of the character portion can be improved (high resolution can be obtained).

Further, according to the image processing apparatus of the second embodiment, the RGB values on the separated white background image area are adjusted so as to be equal with each other, so that a change such that the white background image area is colored can be reduced. As a result, the image quality of the white background portion in the distribution image can be improved. When the distribution image is again output onto paper, the RGB values of the white background portion are previously arranged so as to be equal with each other. For this reason, when the image processing for output is executed, the white background portion can be easily detected, so that the high-quality image can be output.

The present document incorporates by reference the entire contents of Japanese priority documents, JPA P2002-269605 filed in Japan on Sep. 17, 2002 and JPA P2002-274296 filed in Japan on Sep. 20, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus, comprising:
   a determining unit configured to determine image characteristics of areas in an image data corresponding to an image, said determining unit includes an edge separation unit configured to detect a character edge from the image data, a halftone detecting unit configured to determine whether a target pixel is halftone or non-halftone, and a color determining unit configured to determine whether the target pixel is chromatic or achromatic, and said determining unit is configured to generate area data corresponding to each of the areas based at least in part on the character edge detected by the edge separation unit;
   a memory configured to store the image data and the area data in a correlated manner;

an image processing unit including a gamma correction unit, a color correction unit, and a gradation processing unit, wherein said gamma correction unit is configured to effect a gamma correction, using an S-shaped gamma curve line, on specific image data stored in the memory when the specific image data is determined to be a character area as a result of edge-detecting, said gamma correction unit is configured to effect the gamma correction, using a linear gamma line, on the specific image data stored in the memory when the specific image data is determined to be a non-edge area as a result of edge-detecting;

said color correction unit is configured to convert a pixel of the specific image data from CMYK image data to RGB image data in such a way that chroma is heightened when the pixel of the specific image data is determined to be a color character, and that respective values of R, G, and B are equal to each other when the pixel of the specific image data is determined to be a black character, and said image gradation processing unit is configured to effect a simple binarization process where a binarizing threshold value is set low on the pixel of the specific image data when the pixel of the specific image data is determined to be a character area as a result of edge detecting;

said image gradation processing unit is configured to effect a multi-dither process on the pixel of the specific image data when the pixel of the specific image data is determined to be in a picture area as a result of edge detecting;

an image format conversion unit configured to convert a file format of the RGB image data processed by the image processing unit into a general-purpose image file format; and a transmission unit configured to send the image data in the general-purpose image file format to an external device.

2. The image processing apparatus according to claim 1, wherein the image characteristics include one or more of character, photograph, color, and presence of halftone.

3. The image processing apparatus according to claim 2, wherein the image characteristic is any one or more of the character and the photograph.

4. The image processing apparatus according to claim 1, further comprising an image formation unit configured to form an image on a recording medium based on the image data stored in the memory.

5. The image processing apparatus of claim 1, wherein the edge separation unit comprises:

a continuous pixel detecting unit configured to detect target pixels in the image data that match with any one of a plurality of stored pixel patterns of continuously colored pixels.

6. The image processing method of claim 1, wherein the detecting comprises:

detecting target pixels in the image data that match with any one of a plurality of stored pixel patterns of continuously colored pixels.

7. An image processing apparatus, comprising:

an acquiring unit configured to acquire an image data corresponding to an image;

a determining unit configured to determine image characteristics in the image data, said determining unit including an edge separation unit configured to detect a character edge from the image data, a halftone detecting unit configured to determine whether a target pixel is halftone or non-halftone, and a color determining unit configured to determine whether the target pixel is chromatic or achromatic, and said determining unit is configured to generate area data corresponding to each of the areas based at least in part on the character edge detected by the edge separation unit;

a memory configured to store the image data and the area data in a correlated manner;

an image processing unit including a gamma correction unit, a color correction unit, and a gradation processing unit;

said gamma correction unit configured to effect a gamma correction, using an S-shaped gamma curve line, on specific image data stored in the memory when the specific image data is determined to be a character area as a result of edge detecting;

said gamma correction unit is configured to effect the gamma correction, using a linear gamma line, on the specific image data stored in the memory when the specific image data is determined to be a non-edge area as a result of edge detecting;

said color correction unit configured to convert a pixel of the specific image data from CMYK image data to RGB image data in such a way that chroma is heightened when the pixel of the specific image data is determined to be a color character, and that respective values of R, G, and B are equal to each other when the pixel of the specific image data is determined to be a black character;

said image gradation processing unit configured to effect a simple binarization process where a binarizing threshold value is set low on a pixel of the specific image data when the pixel of the specific image data is determined to be a character area as a result of edge detecting and to effect a multi-dither process on the pixel of the specific image data when the pixel of the specific image data is determined to be in a picture area as a result of edge detecting;

an image conversion unit configured to convert a file format of the image data processed by the image processing unit into a general-purpose format image file format; and a transmission unit configured to send the image data in the general-purpose image file format to an external display device.

8. The image processing apparatus according to claim 7, further comprising a filtering unit configured to subject the image data corresponding to the image characteristics to filter processing.

9. The image processing apparatus according to claim 7, wherein the image data acquired by the acquiring unit includes Red, Green, and Blue color components, the image area separation unit is configured to separate an image area corresponding to black characters from the image data, and the image processing unit is configured to adjust the Red, Green, and Blue color components forming the image data in the separated image area of the black characters so that the components have the same value.

10. The image processing apparatus according to claim 7, wherein the image characteristic is a character.

11. The image processing apparatus according to claim 7, wherein the image data acquired by the acquiring unit includes Red, Green, and Blue color components, the image area separation unit is configured to separate the image area corresponding to a white background from the image data, and the image processing unit is configured to adjust the Red, Green, and Blue color components forming the image data on the separated white background image area so that the components have the same value.

12. The image processing apparatus of claim 7, wherein the edge separation unit comprises:
a continuous pixel detecting unit configured to detect target pixels in the image data that match with any one of a plurality of stored pixel patterns of continuously colored pixels.

13. An image processing method, comprising:
determining image characteristics of areas in an image data corresponding to an image;
detecting a character edge from the image data;
determining whether a target pixel is halftone or non-halftone;
determining whether the target pixel is chromatic or achromatic;
generating area data corresponding to each of the areas based at least in part on the character edge detected by the edge separation unit;
storing the image data and the area data in a correlated manner;
effecting a gamma correction, using an S-shaped gamma curve line, on specific image data stored in the memory when the specific image data is determined to be a character area as a result of edge detecting;
effecting the gamma correction, using a linear gamma line, on the specific image data stored in the memory when the specific image data is determined to be a non-edge area as a result of edge detecting;
converting a pixel of the specific image data from CMYK image data to RGB image data in such a way that chroma is heightened when the pixel of the specific image data is determined to be a color character and that respective values of R, G, and B are equal to each other when the pixel of the specific image data is determined to be a black character;
effecting a simple binarization process where a binarizing threshold value is set low on the pixel of the specific image data when the pixel of the specific image data is determined to be a character as a result of edge detecting;
effecting a multi-dither process on the pixel of the specific image data when the pixel of the specific image data is determined to be in a picture area as a result of edge detecting;
converting a file format of the RGB image data processed by the image processing unit into a general-purpose image file format; and
sending the image data in the general-purpose image file format to an external device.

* * * * *